(12) United States Patent
Fukui

(10) Patent No.: US 8,284,257 B2
(45) Date of Patent: Oct. 9, 2012

(54) IMAGE PICK-UP APPARATUS AND TRACKING METHOD THEREFOR

(75) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/547,168

(22) Filed: Aug. 25, 2009

(65) Prior Publication Data

US 2010/0053419 A1 Mar. 4, 2010

(30) Foreign Application Priority Data

Aug. 29, 2008 (JP) ................................ 2008-221790
Aug. 19, 2009 (JP) ................................ 2009-190119

(51) Int. Cl.
*H04N 5/225* (2006.01)
(52) U.S. Cl. .................. 348/169; 348/208.14; 348/170; 348/172; 382/103
(58) Field of Classification Search .................. 348/352, 348/208.14
See application file for complete search history.

(56) References Cited

U.S. PATENT DOCUMENTS

| | | | |
|---|---|---|---|
| 5,467,127 A | 11/1995 | Jong-Pil | |
| 5,848,123 A * | 12/1998 | Strommer | 378/98.8 |
| 6,754,389 B1 * | 6/2004 | Dimitrova et al. | 382/224 |
| 7,466,356 B2 * | 12/2008 | Hofer | 348/333.02 |
| 7,720,257 B2 * | 5/2010 | Morellas et al. | 382/103 |
| 8,149,288 B2 * | 4/2012 | Nakagomi et al. | 348/222.1 |
| 2005/0128291 A1 * | 6/2005 | Murakami | 348/143 |
| 2006/0140445 A1 * | 6/2006 | Cusack | 382/103 |
| 2007/0030375 A1 * | 2/2007 | Ogasawara et al. | 348/333.11 |
| 2008/0204565 A1 * | 8/2008 | Yumiki | 348/208.99 |
| 2009/0009651 A1 * | 1/2009 | Takayanagi | 348/345 |

FOREIGN PATENT DOCUMENTS

| | | |
|---|---|---|
| JP | 06-054326 | 2/1994 |
| JP | 2007-104200 | 4/2007 |

* cited by examiner

*Primary Examiner* — Jason Chan
*Assistant Examiner* — Cynthia Segura
(74) *Attorney, Agent, or Firm* — Cowan, Liebowitz & Latman, P.C.

(57) ABSTRACT

An image pick-up apparatus that enables to appropriately set a holding time in which there is a possibility of returning to a state that allows tracking when a subject cannot be tracked temporarily during the subject tracking to improve the ease-of-use for a user. A specifying unit specifies a subject included in a captured image. A display unit displays the captured image on a screen and displays identification information showing that the specified subject is tracked. A tracking unit tracks the subject. A setting unit sets a holding time in which the display of the identification information is held according to at least one of a focal length of the image pick-up apparatus and a subject distance. An elimination unit eliminates a display of the identification information when the holding time has passed after the tracking unit lost the subject.

11 Claims, 9 Drawing Sheets

ORIGINAL IMAGE DATA

FLESH COLOR REGION EXTRACTED IMAGE DATA

IMAGE DATA TO WHICH HIGH-PASS FILTER IS APPLIED

TEMPLATE MATCHING

| | | SUBJECT DISTANCE (m) | | | | | | |
|---|---|---|---|---|---|---|---|---|
| | | 0.5 | 1 | 2 | 4 | 8 | 16 | INFINITY |
| FOCAL LENGTH | 28mm | 5.0 | 6.0 | 7.2 | 8.0 | 8.0 | 8.0 | 8.0 |
| | 35mm | 4.0 | 4.8 | 5.8 | 6.9 | 8.0 | 8.0 | 8.0 |
| | 56mm | 3.2 | 3.8 | 4.6 | 5.5 | 6.6 | 8.0 | 8.0 |
| | 70mm | 2.6 | 3.1 | 3.7 | 4.4 | 5.3 | 6.4 | 7.6 |
| | 112mm | 2.0 | 2.5 | 2.9 | 3.5 | 4.2 | 5.1 | 6.1 |
| | 140mm | 1.6 | 2.0 | 2.4 | 2.8 | 3.4 | 4.1 | 4.9 |
| | 224mm | 1.3 | 1.6 | 1.9 | 2.3 | 2.7 | 3.3 | 3.9 |
| | 280mm | 1.0 | 1.3 | 1.5 | 1.8 | 2.2 | 2.6 | 3.1 |
| | 448mm | 1.0 | 1.0 | 1.2 | 1.4 | 1.7 | 2.1 | 2.5 |
| | 560mm | 1.0 | 1.0 | 1.0 | 1.2 | 1.4 | 1.7 | 2.0 |

IMAGE PICK-UP APPARATUS AND TRACKING METHOD THEREFOR

BACKGROUND OF THE INVENTION

1. Field of the Invention

The present invention relates to an image pick-up apparatus that generates a captured image, and a tracking method therefor.

2. Description of the Related Art

Conventionally, an image pick-up system that tracks a subject has been known as a monitoring apparatus using a digital camera or a surveillance camera.

For example, Japanese laid-open patent publication (Kokai) No. H06-054326 (JP06-054326A) discloses a system that calculates a motion vector of a subject based on pieces of image data and rotates a camera so as to track the motion of the subject. In order to track and shoot the subject effectively, this system rotates the camera at high speed when a zoom position is telephoto and rotates the camera at low speed when a zoom position is wide.

Japanese laid-open patent publication (Kokai) No. 2007-104200 (JP2007-104200A) discloses that controlling a WB (white balance) and an exposure within a tracking frame that is detected as a flesh color region optimizes performance of controls of a white balance and an exposure.

Thus, various applications, such as the subject tracking system and the apparatus to control a white balance and an exposure using the subject tracking function, have been proposed.

As these tracking methods, a tracking method using correlation between pieces of frame image data by which a motion vector is calculated, a subject tracking method performed based on image characteristic quantity, etc. are general.

However, the above-mentioned conventional image pick-up apparatuses have the following problems. That is, in the tracking method that uses correlation between pieces of image data as the above-mentioned tracking method, when a moving subject being different from a main subject crosses in front of the main subject, for example, the correlation between pieces of the image data of the main subject decreases, there is high possibility of tracking the moving subject that crossed in front of the main subject.

In the tracking method based on image characteristic quantity such as a tint, when a subject similar to a main subject exists in the surroundings of the main subject, it is difficult to continue tracking the main subject.

Also in the tracking method that is a combination of these methods, when the weak conditions for the respective methods are overlapped, it is difficult to continue tracking the main subject.

Japanese laid-open patent publication (Kokai) No. 2007-104200 (JP2007-104200A) discloses a condition for finishing subject tracking. That is, the subject is tracked by using data of an angular velocity sensor and AF (auto-focusing) data, and it is determined that the subject is lost when difference between characteristic quantity of the subject within a tracking region and that at the time of a tracking start becomes large.

However, even when a subject cannot be tracked temporarily, for example, when a car or the like crosses in front of the subject, or when a detected face as the subject turns sideway temporarily, there is a sufficient possibility of returning to the state that allows the tracking within a predetermined time.

In such a case, if a time during which the subject cannot be tracked is temporarily short, the system can be controlled without loosing the subject by fixing the tracking region temporarily and by restarting the tracking again when a subject that has high correlation with the original subject is detected again after the lapse of time. This enables to improve the ease-of-use of the apparatus.

Here, the image pick-up apparatus provided with such a subject tracking function has a function that generates an image on which a frame (a tracking frame) is superimposed on the tracking region and displays it on a monitoring device, in order that a user can check easily whether the subject tracking is succeeding or not.

When a main subject is lost, the tracking frame should be eliminated. However, if the tracking frame is immediately eliminated after loosing, the tracking frame returns immediately when the main subject is found immediately after that, which may serve as rather unseemly display.

Therefore, when the main subject is lost temporarily, the display of the tracking frame should be continued, but when the main subject is completely lost, the display of the tracking frame should be eliminated. However, the decision thereof is extremely difficult.

SUMMARY OF THE INVENTION

The present invention provides an image pick-up apparatus and a tracking method therefor that are capable of appropriately setting a holding time in which there is a possibility of returning to a state that allows tracking when a subject cannot be tracked temporarily during the subject tracking to improve the ease-of-use for a user.

Accordingly, a first aspect of the present invention provides an image pick-up apparatus that generates a captured image comprising a specifying unit adapted to specify a subject included in the captured image, a display unit adapted to display the captured image on a screen and display identification information showing that the specified subject is tracked, a tracking unit adapted to track the subject, a setting unit adapted to set a holding time in which the display of the identification information is held according to at least one of a focal length of the image pick-up apparatus and a subject distance, and an elimination unit adapted to eliminate a display of the identification information when the holding time has passed after the tracking unit lost the subject.

Accordingly, a second aspect of the present invention provides a tracking method for an image pick-up apparatus that generates a captured image, the method comprising a specifying step of the image pick-up apparatus specifying a subject included in the captured image, a display step of the image pick-up apparatus displaying the captured image on a screen and display identification information showing that the specified subject is tracked, a tracking step of the image pick-up apparatus tracking the subject, a setting step of the image pick-up apparatus setting a holding time in which the display of the identification information is held according to at least one of a focal length of the image pick-up apparatus and a subject distance, and an elimination step of the image pick-up apparatus eliminating a display of the identification information when the holding time has passed after the subject has been lost in the tracking step.

According to the present invention, the holding time to hold the display of identification information showing that the subject is being tracked can be established according to at least one of the focal length and the subject distance, when controlling the display and the elimination of the identification information. When the holding time lapses after loosing the subject, the image pick-up apparatus finishes the display of the identification information. Therefore, a holding time in which there is a possibility of returning to a state that allows tracking when a subject cannot be tracked temporarily during the subject tracking can be appropriately established, which improves the ease-of-use for a user.

The features and advantages of the invention will become more apparent from the following detailed description taken in conjunction with the accompanying drawings.

DETAILED DESCRIPTION OF PREFERRED EMBODIMENTS

Figure 1:
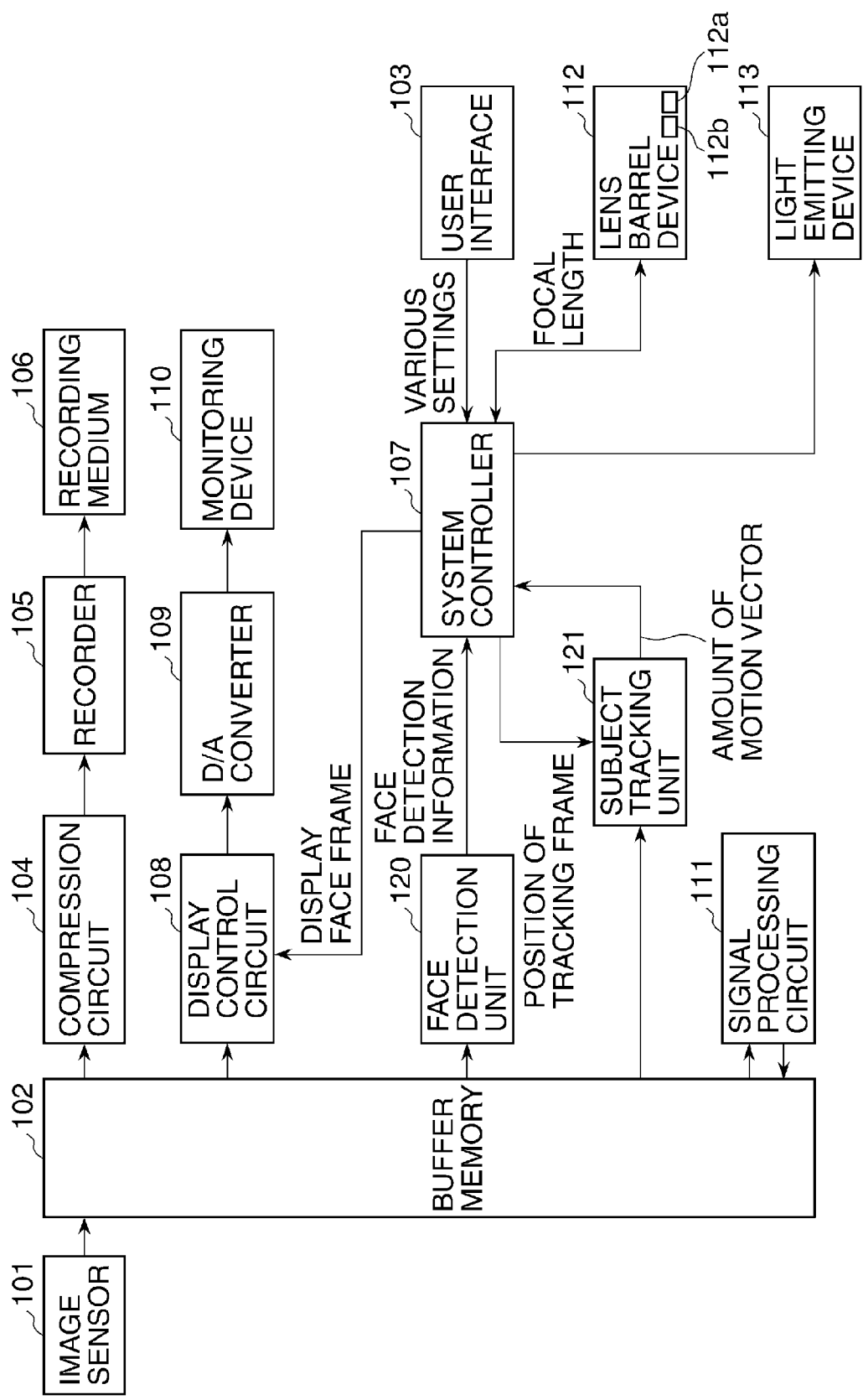
FIG. 1 is a block diagram schematically showing a configuration of an image pick-up apparatus according to an embodiment of the present invention.

Hereafter, an embodiment of an image pick-up apparatus and a tracking method thereof according to the present invention will be described in detail with reference to the attached drawings. FIG. 1 is a block diagram schematically showing a configuration of an image pick-up apparatus according to the embodiment. The image pick-up apparatus has an image sensor 101, a buffer memory 102, a user interface 103, a compression circuit 104, a recorder 105, a recording medium 106, a system controller 107, a display control circuit 108, a D/A converter 109, and a monitoring device 110. Further, the image pick-up apparatus has a signal processing circuit 111, a lens barrel device 112, a light emitting device 113, a face detection unit 120, and a subject tracking unit 121. In the lens barrel device 112, an image stabilizer (IS) 112$a$ and an angular velocity sensor 112$b$ are mounted.

Receiving a shooting instruction from a user via the user interface 103, the system controller 107 shoots by controlling a focal position and an aperture/mechanical shutter of the lens barrel device 112, the image sensor 101 formed of a CCD, the light emitting device 113 when performing a flash shooting, etc.

After shooting, the image sensor 101 outputs an image signal, which is stored in the buffer memory 102. Then, the signal processing circuit 111 applies a signal processing for generating an image to the image signal stored in the buffer memory 102 to generate YUV image data.

The generated image data is stored in the buffer memory 102. When recording the image data, it is transmitted from the buffer memory 102 to the compression circuit (compression/expansion circuit) 104 and is compressed as a JPEG file. The compressed image data is recorded on the recording medium 106 by the recorder (recorder/reader) 105.

When the display control circuit 108 generates display image data (a shot image) based on the YUV image data stored in the buffer memory 102, the shot image is converted by the D/A converter 109 and is displayed on the screen of the monitoring device 110.

When performing a face detection from the image data, the face detection unit 120 performs the face detection from the YUV image data stored in the buffer memory 102 or CCD image data, and outputs a coordinate position (location) in the image data.

When the face detection unit 120 detects a face, the system controller 107 instructs the display control circuit 108 to display a fade frame at the face position. Then, the system controller 107 selects one of the detected faces as a tracking target and instructs the display control circuit 108 to display a tracking frame in place of the face frame at the position of the face selected as the tracking target. The tracking frame is used as identification information by which a user identifies which subject is tracked.

When the subject tracking is performed while capturing moving images or using an EVF (Electric View Finder), the subject tracking unit 121 acquires the image data within the tracking target region, which includes a tracking subject, from the system controller 107. And the subject tracking unit 121 acquires the position of the tracking target region in a new frame image data by calculating the correlation between pieces of the image data of the tracking target region and newly acquired frame image data. The system controller 107 instructs the display control circuit 108 to change the position of the tracking frame to the position of the tracking target region that is newly acquired by the subject tracking unit 121 in the new frame image data.

According to the embodiment, the system controller 107 receives the face position detected by the face detection unit 120 as face detection information, and sets the image data of the face position as the image data of the tracking target region. And while the subject tracking unit 121 repeatedly detects image data having the highest correlation with the image data within the tracking target region, a subject is tracked. The subject tracking unit 121 does not use the face position that is newly detected by the face detection unit 120, while the subject is tracked successfully. The subject tracking unit 121 sets the face position detected by the face detection unit 120 as the tracking target region again, when the tracking frame is eliminated due to a failure of the tracking. Although the present embodiment is described with the assumption that the subject set as the tracking target is a human face, the subject is not limited to the human face. For example, a subject freely specified by a user via the user interface (control panel) 103 may be set as a tracking target.

Figure 2:
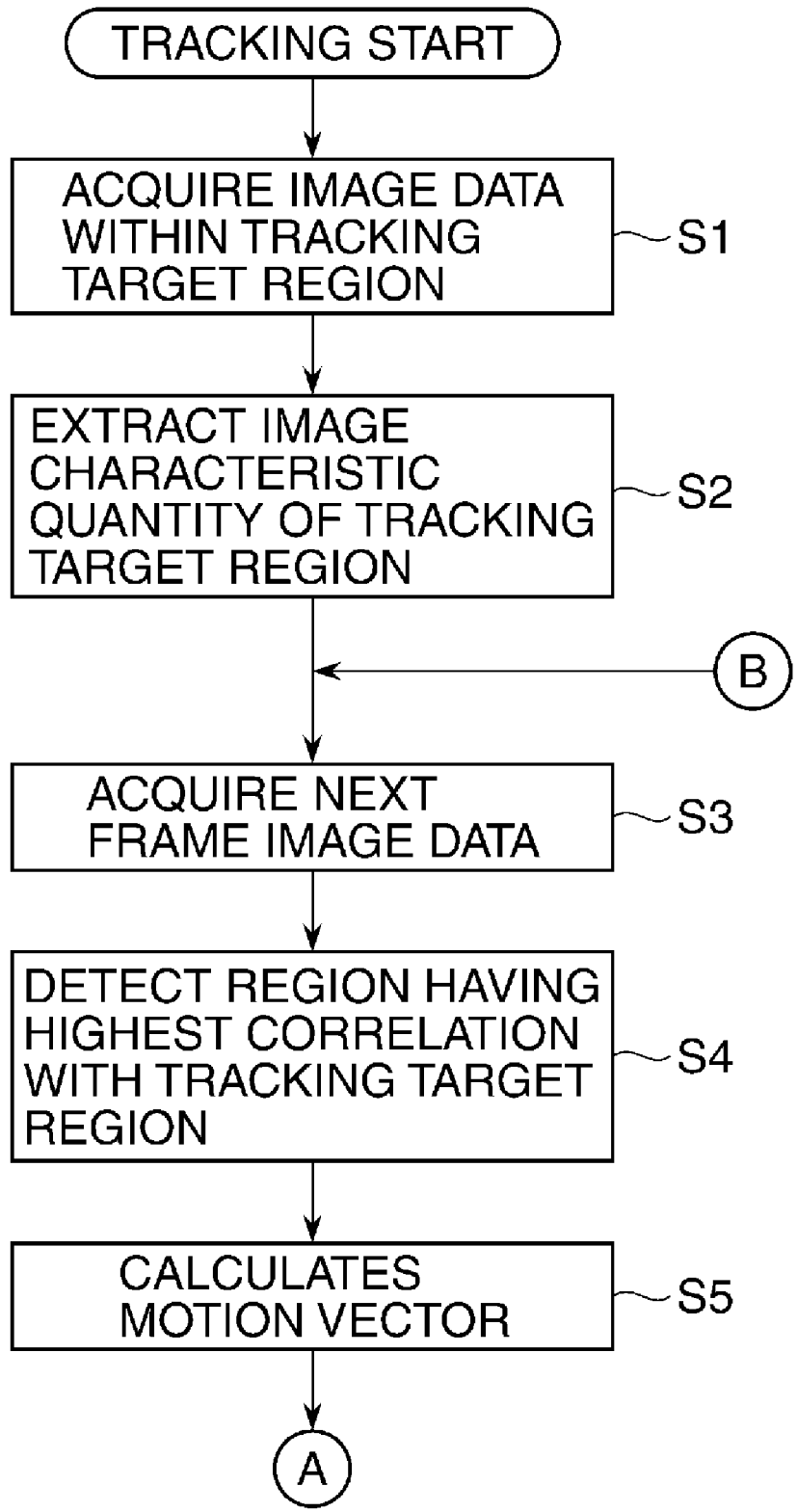
FIG. 2 is a flowchart showing the first half of a subject tracking operation of the image pick-up apparatus of FIG. 1.
Figure 3:
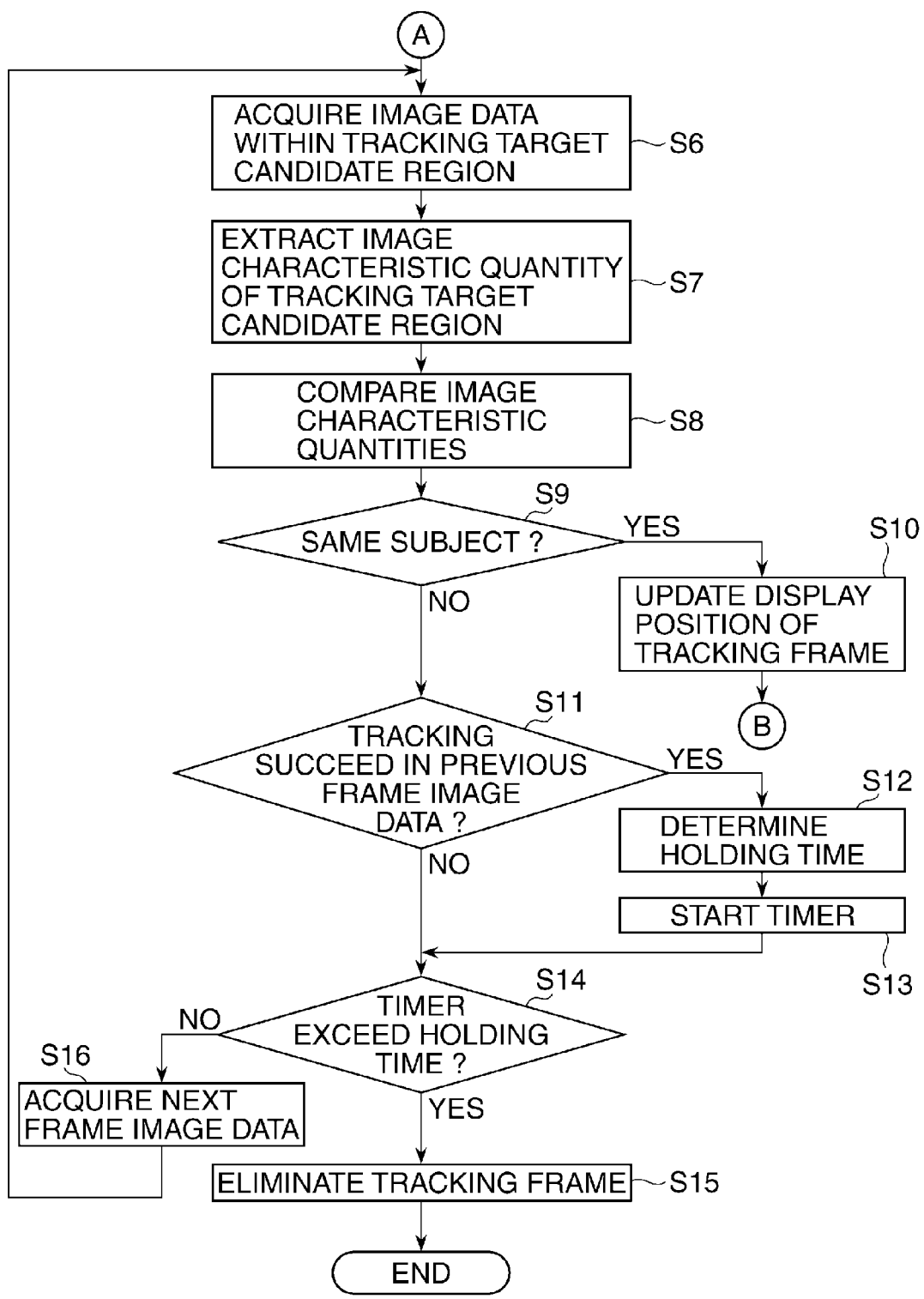
FIG. 3 is a flowchart showing the second half of the subject tracking operation of the image pick-up apparatus of FIG. 1.

In the image pick-up apparatus that has the above-mentioned configuration, the method of tracking the face detected by the face detection unit 120 will be described. FIG. 2 and FIG. 3 are flowcharts showing the subject tracking operation. The process is executed by the subject tracking unit 121.

The subject tracking unit 121 acquires a tracking target region from the system controller 107, and acquires the image data within the tracking target region (step S1). As mentioned above, in this embodiment, the system controller 107 sets the region of the face position detected by the face detection unit 120 as a first tracking target region.

The subject tracking unit 121 extracts the image characteristic quantity of the first tracking target region (step S2). The image characteristic quantity is color information such as brightness and a tint, for example.

The subject tracking unit 121 acquires next frame image data (step S3). The subject tracking unit 121 detects the region having the highest correlation with the tracking target region from the next frame image data (step S4), and calculates a motion vector (step S5). The details of the calculations of the correlation and the motion vector will be described later.

The subject tracking unit 121 moves the position of the tracking target region by the amount of the motion vector and finds the position of a tracking target candidate region, and acquires image data within the tracking target candidate region from the next frame image data (step S6). That is, the subject tracking unit 121 acquires the image data within the tracking target candidate region having the highest correlation with the tracking target region from the next frame image data. The subject tracking unit 121 extracts the image characteristic quantity of the tracking target candidate region in the same manner as step S2 (step S7).

The subject tracking unit 121 compares the image characteristic quantity of the tracking target region acquired in step S2 with the image characteristic quantity of the tracking target candidate region acquired in step S7 (step S8). As a result of the comparison, the subject tracking unit 121 determines whether the difference of the image characteristic quantities falls within a predetermined range (step S9). That is, the subject tracking unit 121 determines whether the subject in the tracking target candidate region acquired in step S6 is the same as the subject in the first tracking target region set up in step S1.

When the difference of the image characteristic quantities falls within the predetermined range, the subject tracking unit 121 informs the system controller 107 about success of the subject tracking. The system controller 107 updates the tracking target region by replacing with the tracking target candidate region acquired in step S6 as a new tracking target region, and instructs the display control circuit 108 to update the display position of the tracking frame based on the position of the updated tracking target region (step S10). When a timer has started in step S13, mentioned later, the system controller 107 makes the timer stop and resets the holding time.

Then, the subject tracking unit 121 returns to the process in step S3, and newly acquires next frame image data. The subject tracking unit 121 detects a tracking target candidate region that is most similar to the tracking target region updated in step S10 from the next frame image data in steps S4 through S6, and calculates the image characteristic quantity of the tracking target candidate region in step S7. The subject tracking unit 121 compares the image characteristic quantity of the tracking target candidate region with the image characteristic quantity of the initial tracking target region calculated in step S2. The system controller 107 updates the tracking target region again if the difference of the quantities falls within the predetermined range.

Thus, the subject tracking unit 121 detects a tracking target candidate region that has high correlation with the tracking target region from a new frame image data. And if the tracking target candidate region and the initial tracking target region is similar in the image characteristic quantity, the subject tracking unit 121 updates the tracking target region by replacing with the tracking target candidate region. The subject tracking unit 121 can continue the tracking by updating the tracking target region, even if a direction of a subject changes gradually or a shape of a subject changes gradually. However, if the difference of the image characteristic quantities between the tracking target candidate region and the initial tracking target region exceeds the predetermined range, there is a high possibility that a subject being different from the initial tracking subject has been detected as a tracking target candidate region. In such a case, it is determined that the tracking has failed.

On the other hand, returning to step S9, if the difference of the image characteristic quantities does not fall within the predetermined range, the subject tracking unit 121 determines that the tracking has failed, and proceeds with the process to a subject tracking failure routine in and after step S11.

The subject tracking unit 121 determines whether the tracking has succeeded in the previous frame image data (step S11). If the tracking has succeeded in the previous frame image data, the subject tracking unit 121 determines (establishes) the holding time on the assumption that the tracking has failed for the first time in the frame of the present stage (step S12). The holding time is a time for holding the display of the tracking frame as-is even if a tracking fails. As mentioned below, the holding time is established by acquiring a focal length controlled in the lens barrel device 112, a subject position and a subject distance detected before the previous frame image data, control information of the image stabilizer (IS) 112a, an output of the angular velocity sensor 112b, and the like.

The subject tracking unit 121 starts the built-in timer (step S13), and proceeds with the process to step S14.

On the other hand, when it is determined that the tracking has failed also in the previous frame image data in step S11, the subject tracking unit 121 determines whether the elapsed time of the timer exceeds the predetermined holding time (step S14) on the assumption that the tracking has failed subsequent to the failure in the previous frame image data.

When the elapsed time does not exceed the predetermined holding time, the subject tracking unit 121 acquires next frame image data (step S16) while making the display control circuit 108 to continue the display of the tracking frame in the same position, and returns to the process in step S6. When the subject tracking unit 121 proceeds with the process from step S16 to step S6, the finally updated tracking target region is set as the tracking target candidate region.

On the other hand, when the predetermined holding time is exceeded (elapsed), the subject tracking unit 121 determines to eliminate the tracking frame (step S15), and finishes the process. The determination of elimination of the tracking frame is transmitted to the system controller 107 from the subject tracking unit 121. The system controller 107 sends the instruction to eliminate the tracking frame to the display control circuit 108 according to the determination, and then, the tracking frame is eliminated. This finishes the tracking.

Next, the face detection method by the face detection unit 120 will be described. Many methods are proposed as a face detection method. Generally, there are a method using a learning represented by the neural network, a method using template matching of regions including a part characterized in physical shape such as an eye and a nose, a method using statistical analysis of detected image characteristic quantity such as a skin color and an eye shape. In general, a face detection method combines these methods.

Figure 4:
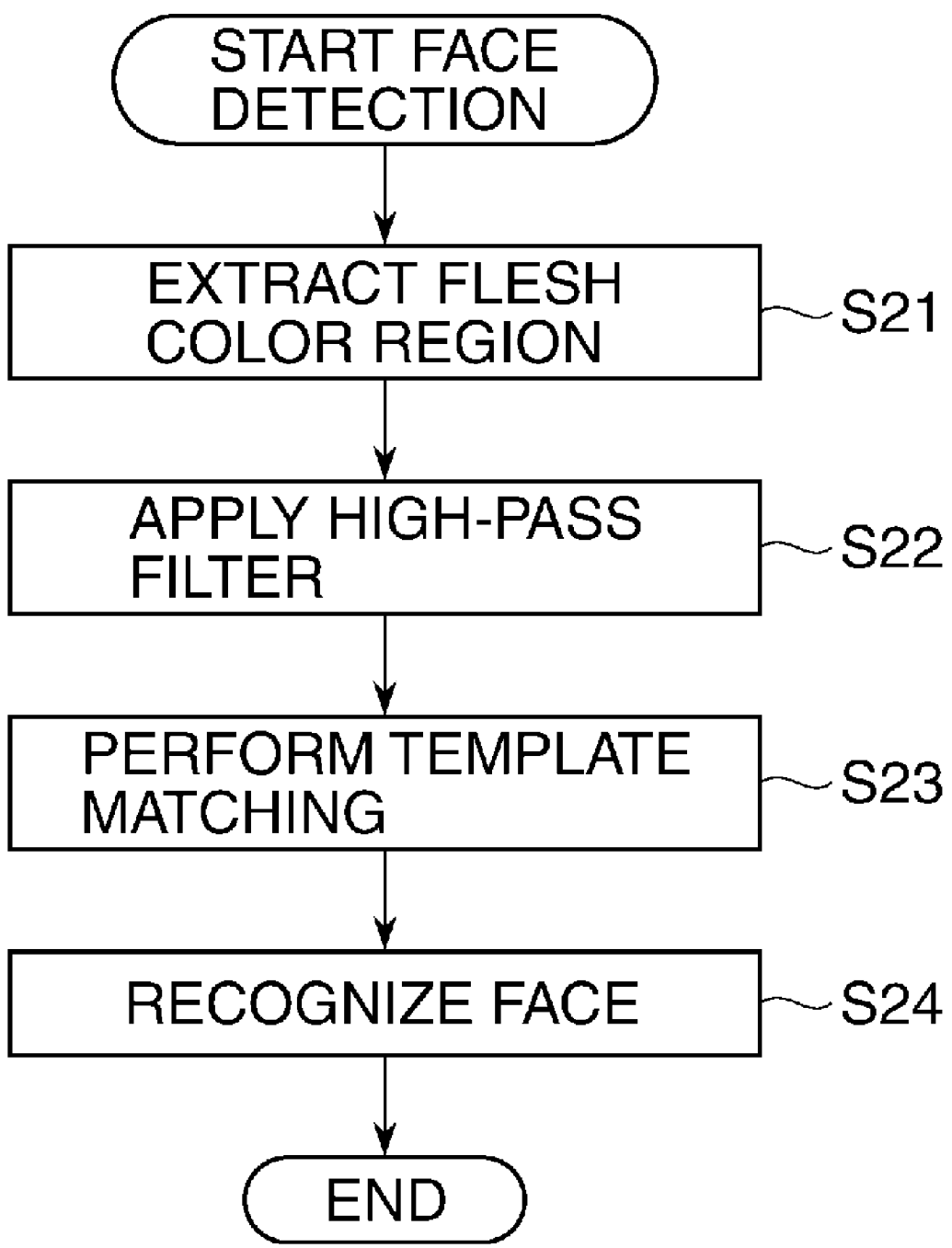
FIG. 4 is a flowchart showing a face detection process of the image pick-up apparatus of FIG. 1.
Figure 5A:
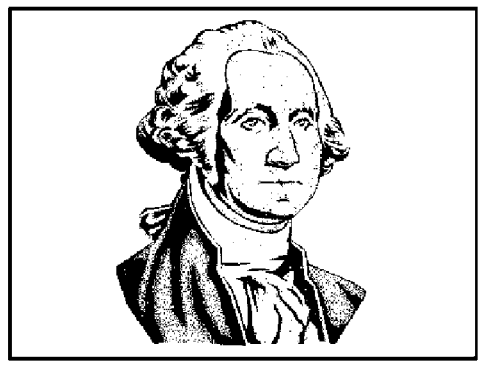
FIG. 5A is a view showing original image data that is a target of the face detection process of the image pick-up apparatus of FIG. 1.

Many face detection methods are proposed at the present time. For example, there are a method for detecting a face using the wavelet transform and image characteristic quantity, a method further combining template matching etc. FIG. 4 is a flowchart showing a face detection process as an example of them. The process is executed by the face detection unit 120 as mentioned above. FIGS. 5A through 5D are views useful in explaining a face detecting method. FIG. 5A shows target image data (an original image) from which a face is detected.

Figure 5B:
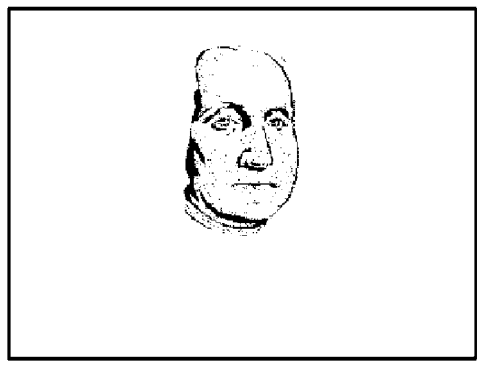
FIG. 5B is a view showing image data of a flesh color region that is extracted from the original image data by the face detection process of the image pick-up apparatus of FIG. 1.
Figures 6, 7:
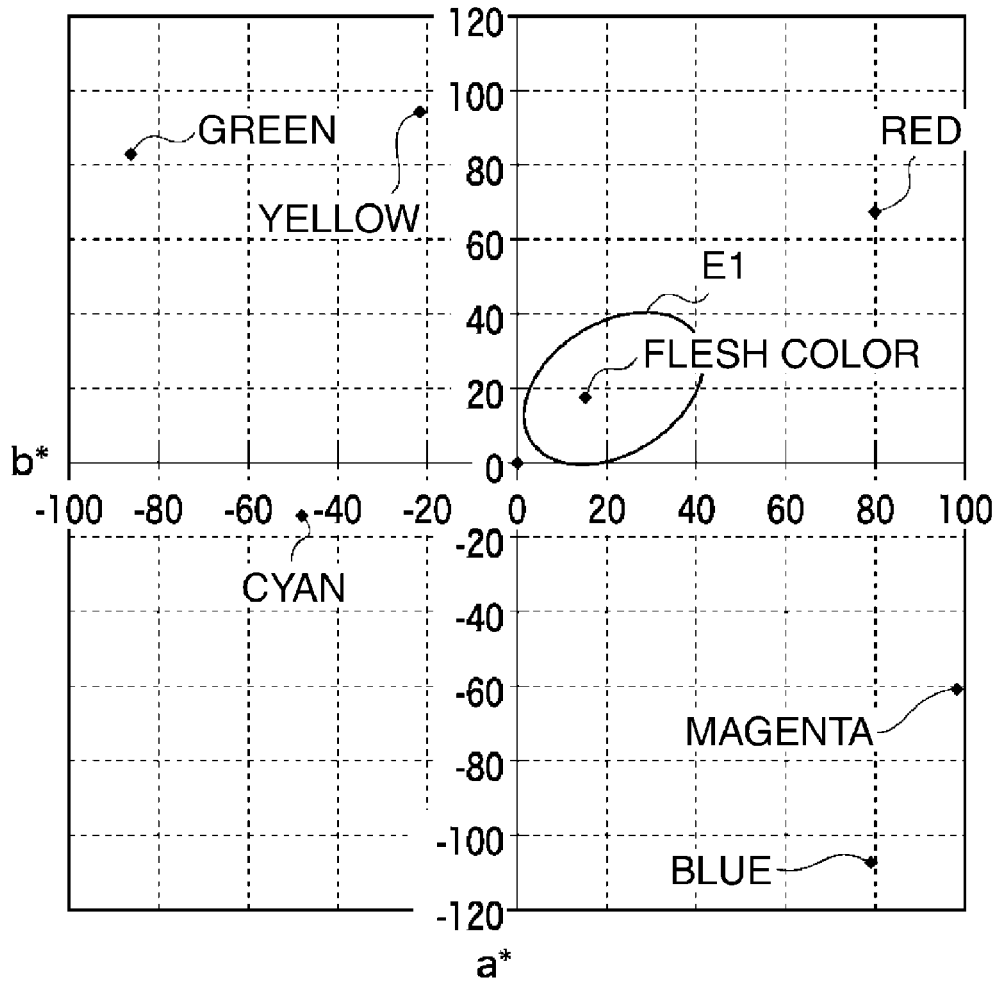
FIG. 6 is a chromaticity diagram showing representative colors in the CIE 1976 Lab color space of the CIELAB.
FIG. 7 is a view showing a matrix of an example of a two-dimensional high-pass filter in which factors used for a spatial-filtering process of the image pick-up apparatus of FIG. 1 are shown.

First, the face detection unit 120 performs a flesh color region extraction process, and extracts a flesh color region from the target image data (step S21). FIG. 6 is a chromaticity diagram showing representative colors in the CIE 1976 Lab color space of the CIELAB. The area shown by an ellipse E1 has a high possibility of a flesh color region. FIG. 5B shows the image data of a region in which chromaticity is the flesh color that has been extracted from the target image data by the process in step S21.

Figure 5C:
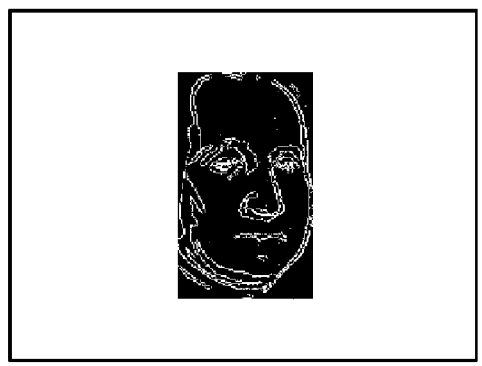
FIG. 5C is a view showing image data that is obtained by applying a high-pass filter to the image data of the flesh color region by the face detection process of the image pick-up apparatus of FIG. 1.

The face detection unit 120 performs a spatial-filtering process in which a high-pass filter is applied to the image data of the extracted flesh color region (step S22). FIG. 7 is a view showing a matrix of an example of a two-dimensional high-pass filter in which factors used for a spatial-filtering process are shown. FIG. 5C is a view showing image data that is acquired by applying the high-pass filter of FIG. 7 to the image data of FIG. 5B. Applying the high-pass filter emphasizes outlines of parts having variations such as an eye or a nose among the image data.

Figure 5D:
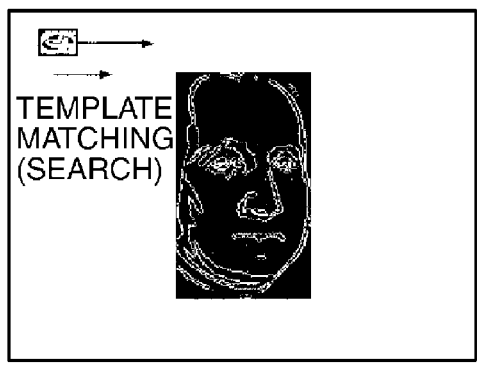
FIG. 5D is a view showing a template matching method with respect to the image data to which the high-pass filter has been applied by the face detection process of the image pick-up apparatus of FIG. 1.

Further, the face detection unit 120 performs template matching, and detects the eye in the image data (step S23). FIG. 5D is a view showing a template matching method applied to the image data of FIG. 5C that shows a result of applying the high-pass filter. The face detection unit 120 recognizes the face based on the positional relationship of the detected eye regions, and extracts characteristic quantities, such as a direction and a size (step 524). Then, the face detection unit 120 finishes the process. It should be noted that the process may be modified by omitting the step S21, applying the high-pass filter to the entire region of the target image data in step S22, and recognizing the face by performing the template matching in step S23.

The face detection information that includes the characteristic quantities such as a direction and a size extracted in step S24 is transmitted to the system controller 107 from the face detection unit 120. The system controller 107 determines the region (tracking frame) that serves as a tracking target from the face detection information.

Next, the method for tracking a subject will be described. Many methods of detecting correlation and a motion vector of a subject are proposed. Here, a comparatively simple method will be described.

Figure 8:
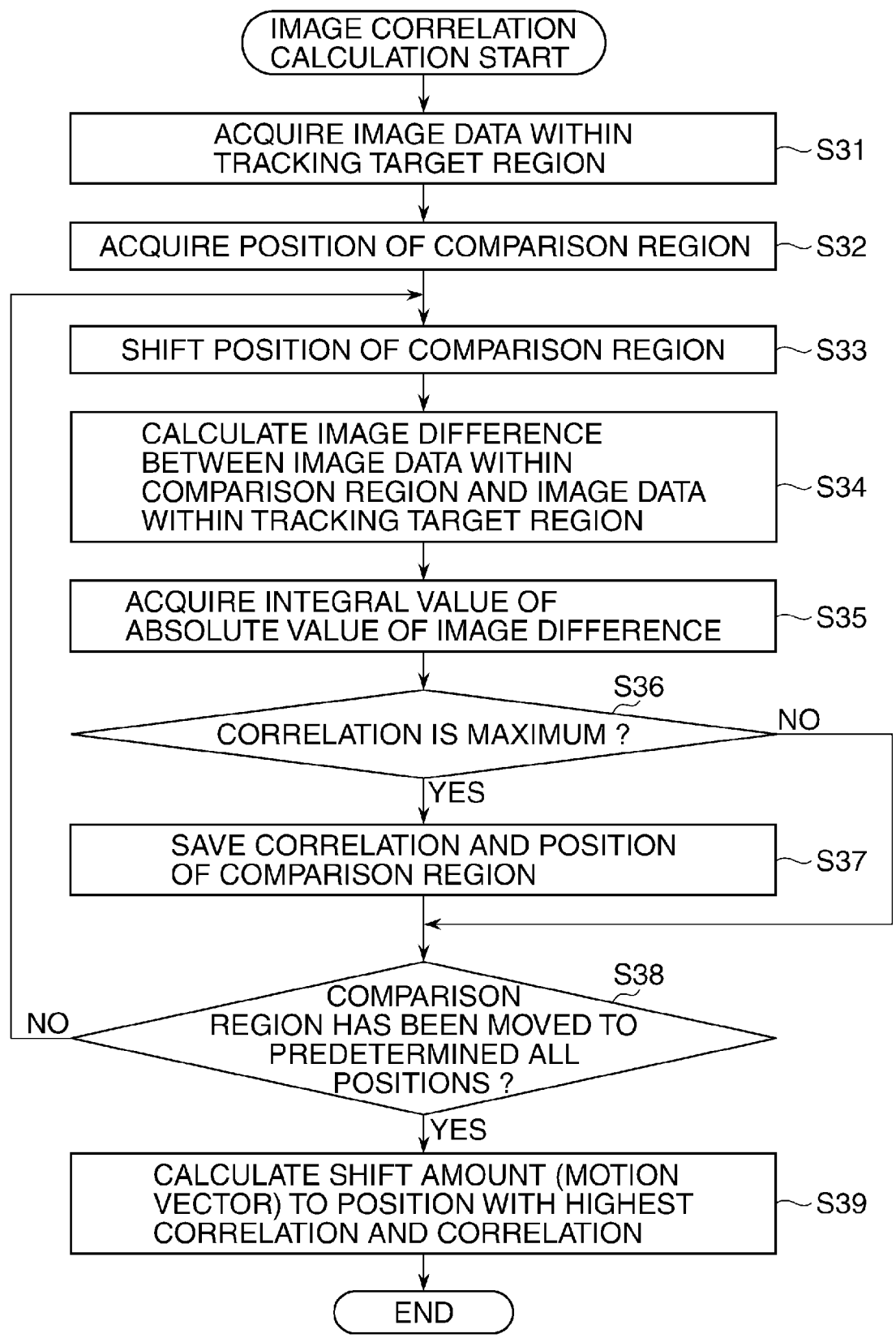
FIG. 8 is a flowchart showing procedures corresponding to steps S4 and S5 of FIG. 2 for calculating correlation between pieces of the image data.

FIG. 8 is a flowchart showing a process for calculating correlation between pieces of image data. This process corresponds to the process in steps S4 and S5 of the tracking process shown in FIG. 2.

Figure 9A:
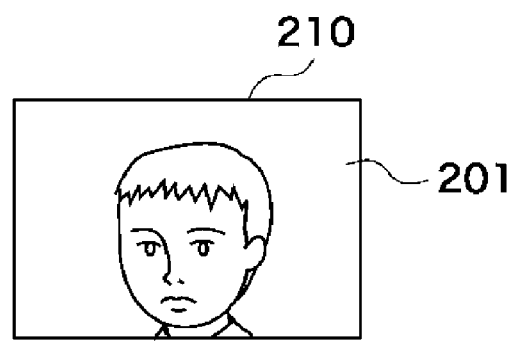
FIG. 9A is a view showing image data of a tracking target region that is an origin for calculating the correlation in the tracking process of FIG. 8.
Figure 9B:
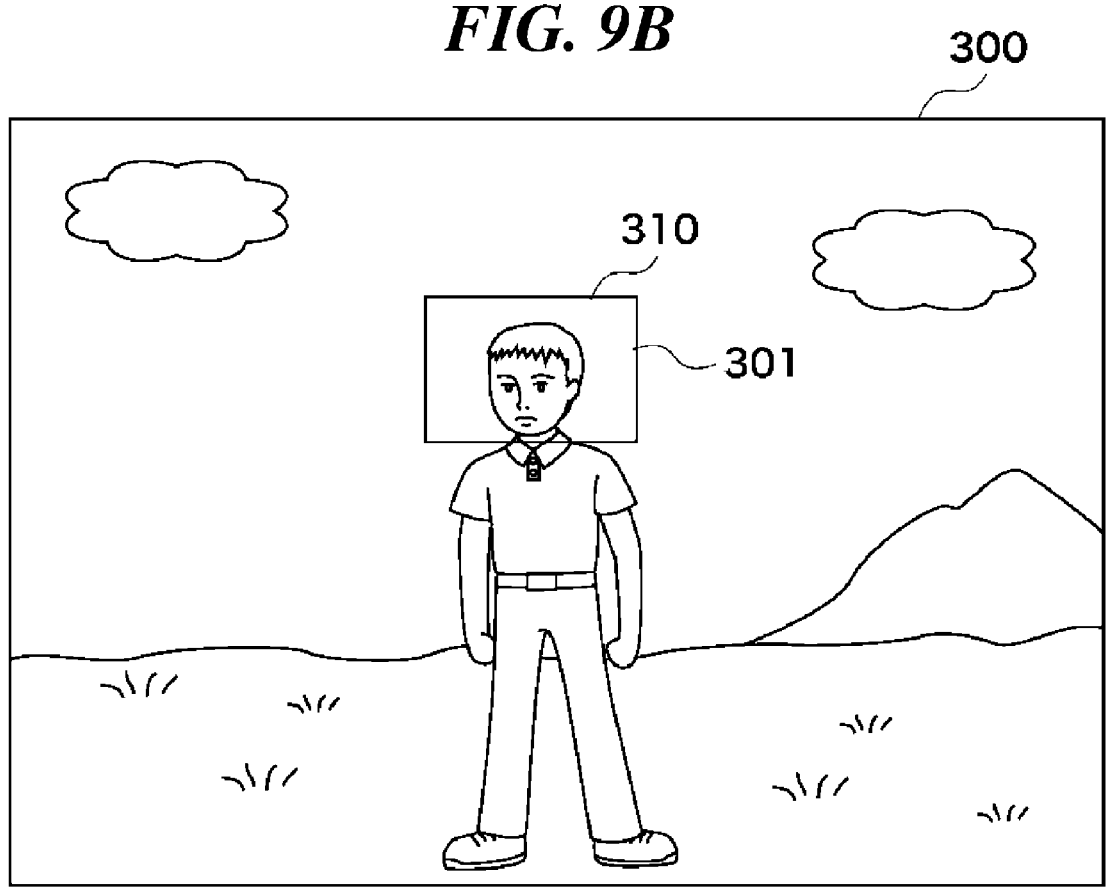
FIG. 9B is a view showing the next frame image data that is a target for calculating the correlation in the tracking process of FIG. 8.

FIG. 9A and FIG. 9B are views showing the image data of the tracking target region in the previous frame image data, and the next frame image data, respectively. The subject tracking unit 121 acquires image data 201 within the tracking target region that is an origin for calculating the correlation (step S31). It should be noted that the tracking frame 210 is established so as to surround the image data 201 within the tracking target region as shown in FIG. 9A.

Then, the subject tracking unit 121 acquires the position of a comparison region that exists at the same position as the image data 201 within the tracking target region in frame image data 300 that is acquired at the next timing of acquisition of the image data 201 within the tracking target region (step S32).

The subject tracking unit 121 shifts the position of the comparison region in a vertical, horizontal, or oblique direction within a predetermined region of the frame image data 300, and acquires the image data within the comparison region at the shifted position (step S33).

The subject tracking unit 121 calculates the image difference between the image data within the comparison region acquired in step S33 and the image data 201 within the tracking target region (step S34). The subject tracking unit 121 acquires the integral value of the absolute value of the image difference calculated in step S34 (step S35). Here, the smaller the integral value of the absolute value of the image difference is, the higher the correlation between pieces of the image data is (the correlation between pieces of the image data becomes higher).

The subject tracking unit 121 determines whether the correlation between pieces of the image data is the maximum among the values that have been acquired till then (step S36). When the correlation between pieces of the image data is the maximum, the subject tracking unit 121 saves the correlation and the position of the comparison region (step S37). On the other hand, when correlation between pieces of the image data is not the maximum, the subject tracking unit 121 proceeds with the process to step S38 as-is.

The subject tracking unit 121 determines whether the position of the comparison region has been moved in step S33 to all the positions established beforehand, including the position acquired in step S32 (step S38). When the comparison region has not been moved to all the positions, the subject tracking unit 121 returns the process to step S33. On the other hand, when the comparison region has been moved to all the positions, the subject tracking unit 121 calculates the shift amount (motion vector) to the position with the highest correlation and the correlation (step S39). In FIG. 9B, the image data 301 shows the image data within the comparison region that is determined to have the highest correlation with the image data 201 within the tracking target region. Then, the subject tracking unit 121 finishes the process. It should be noted that there are many methods of calculating the motion vector, and the method is not limited to the above-mentioned method.

Figures 10A, 10B:
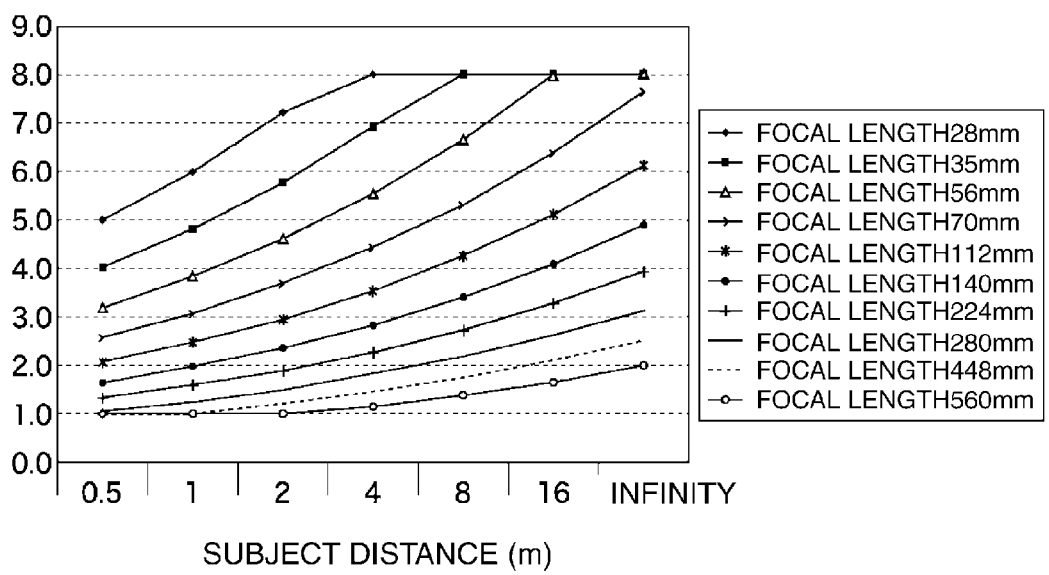
FIG. 10A shows a table showing a holding time corresponding to a focal length and a subject distance that are bases for calculating the holding time in step S12 of FIG. 3.
FIG. 10B shows a graph showing a holding time corresponding to a focal length and a subject distance that are bases for calculating the holding time in step S12 of FIG. 3.

Next, the setting of the holding time in step S12 will be described. FIGS. 10A and 10B show the table and graph that show the holding time corresponding to a focal length and a subject distance. In the table in FIG. 10A and the graph in FIG. 10B, the holding time is set based on a combination of a subject distance and a focal length.

Here, the longer the focal length is, the shorter the holding time is set. Namely, when zooming up (i.e., when the focal length is long), since there is a high possibility that a subject as a tracking target goes out from a field of view because of a variation of a field of view due to a hand shake etc. or a movement of the subject, the short holding time is set in such a case. Accordingly, if the tracking fails, a time required to shift to a detection of a next subject becomes shorter. Similarly, the shorter the subject distance is, the shorter the holding time is set. That's because when the subject distance is shorter, the possibility that a main subject goes out from a field of view becomes higher. It should be noted that the same effect is acquired by adjusting the holding time according to a size of a main subject within a field of a captured image instead of the subject distance. In such a case, the larger the size of a main subject is, the longer the holding time is.

Similarly, the holding time may be determined according to the combination of the focal length and the position at which the subject tracking failed within a field of a captured image. That is, when the distance between a position of the subject detected before the previous frame and a center of the field of the captured image is longer (i.e., when the subject is located in periphery), the possibility that a main subject goes out from the field of view becomes higher. In such a case, the short holding time is preferably set.

It is also possible to detect that a main subject goes out from a field of view based on at least one of the focal length, the control information for the image stabilizer (IS), the output of the angular velocity sensor, and the subject position. When the output from the angular velocity sensor or the IS is larger than a predetermined value, it is determined that the main subject goes out from the field of view, and thus the short holding time may be set.

When it is determined that a tripod is equipped with the image pick-up apparatus, the long holding time may be set. Whether the tripod is equipped or not is determined based on the output from the angular velocity sensor mounted on the image pick-up apparatus. When correlation between pieces of the image data in parts other than a main subject is extremely high, it may be determined that a tripod is equipped, and the long holding time may be set.

The holding time may be set not only according to a focal length or a subject distance but also according to subject brightness, a color temperature, or sensitivity of the image sensor. For example, when the sensitivity of the image sensor is set highly, a noise increases, and when the subject brightness is low, the correlation between the subjects decreases. Therefore, the accuracy of the face detection process or the tracking process decreases. In such a case, since a possibility that the tracking frame is displayed at an incorrect position increases, the holding time is set shorter. When the color temperature is low, a low-intensity light source, such as an electric bulb, is used in general, and it is assumed that the subject brightness is low. Therefore, the holding time may be set according to the color temperature.

The image pick-up apparatus of the embodiment controls a display and an elimination of the tracking frame showing that a subject is being tracked, during the shoot setting and the signal processing optimal to the subject using the subject tracking function. Further, since the image pick-up apparatus controls the holding time during which the tracking frame is displayed in spite of failure of the subject tracking according to the focal length etc., the ease-of-use for a user can be improved.

Thus, the image pick-up apparatus sets the holding time according to the focal length when controlling the display and elimination of the tracking frame showing that the subject is being tracked. When the established holding time lapses after loosing the subject, the image pick-up apparatus finishes the display of the tracking frame. Therefore, a holding time in which there is a possibility of returning to a state that allows tracking when a subject cannot be tracked temporarily during the subject tracking can be appropriately established, which improves the ease-of-use for a user.

Even if the subject is lost temporarily, it can return to tracking state promptly as long as within the holding time.

When zooming up (i.e., when the focal length is long), there is a high possibility that a tracking subject goes out from a field of view because of a variation of a field of view due to a hand shake etc. or a movement of the subject. However, when the focal length is longer, the holding time is set shorter, which shortens the time for performing the tracking process. As a result, it is easy to shift to a detection of a next subject.

Further, the image pick-up apparatus can counter the problem that a main subject easily goes out from a field of view as the subject distance becomes shorter. Further, the image pick-up apparatus can counter the problem that a main subject easily goes out from a field of view as the distance between the position at which the subject tracking has failed and a center of the field of the captured image becomes larger. Further, the image pick-up apparatus can counter the problem that a main subject easily goes out from a field of view as the shake of the apparatus becomes larger. Further, since a subject is specified automatically or specified by a user, it becomes easier to specify the subject. Further, since the tracking frame is displayed to indicate the subject of the tracking target, it is easy to identify the subject region.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

For example, although the face detection unit 120 performs a face detection and specifies the region including the face position as a subject region in the above-mentioned embodiment, the user appointed region that is appointed by a user via the user interface 103 can be specified, as mentioned above.

Although the CCD element is used as the image sensor in the above-mentioned embodiment, a CMOS device etc. may be used.

The monitoring (display) device is not limited to a liquid crystal display, but an organic electroluminescence display, a surface electric-field display (SED), a plasma display, etc. may be used.

The present invention is applicable to a compact type digital camera, a digital video camera, a digital SLR (single-lens reflex) camera, etc. as an image pick-up apparatus.

This application claims priority from Japanese Patent Application No. 2008-221790, filed on Aug. 29, 2008, and which is hereby incorporated by reference herein in its entirety.

What is claimed is:

1. An image pick-up apparatus that generates captured images in series, comprising:
   a specifying unit adapted to specify a subject included in the captured image;
   a tracking unit adapted to track the specified subject by extracting a region of the specified subject in the presently generated captured image having high correlation with a region of the specified subject in the precedently generated captured image;
   a display unit adapted to display the captured image on a screen and display identification information showing that the specified subject is tracked; and
   a setting unit adapted to set a holding time in which the display of the identification information is held according to a sensitivity of an image sensor of the image pick-up apparatus, wherein said display unit continues to display the identification information when the holding time does not lapse after said tracking unit lost the subject, and eliminates a display of the identification information when the holding time has passed after said tracking unit lost the subject, and wherein said setting unit sets the holding time shorter as the sensitivity of the image sensor is set higher.

2. The image pick-up apparatus according to claim 1, wherein said setting unit sets the shorter holding time as a focal length of the image pick-up apparatus becomes longer.

3. The image pick-up apparatus according to claim 1, wherein said setting unit sets the longer holding time as a subject distance becomes longer.

4. The image pick-up apparatus according to claim 1, wherein said setting unit sets the holding time according to a combination of the focal length and the subject distance.

5. The image pick-up apparatus according to claim 1, wherein said setting unit sets the holding time according to the position at which the subject tracking has failed in the field of the captured image.

6. The image pick-up apparatus according to claim 5, wherein said setting unit sets the shorter holding time as the distance between the position at which the subject tracking has failed and a center of the field of the captured image becomes larger.

7. The image pick-up apparatus according to claim 1, wherein said setting unit sets the holding time according to one of control information for an image stabilizer and an output from an angle velocity sensor.

8. The image pick-up apparatus according to claim 7, wherein said setting unit sets the shorter holding time when it is determined that the image pick-up apparatus shakes according to one of the control information and the output as compared with the holding time when the image pick-up apparatus does not shake.

9. The image pick-up apparatus according to claim 1, wherein said specifying unit is further provided with a detection unit adapted to detect the subject included in the captured image.

10. The image pick-up apparatus according to claim 1, wherein the identification information displayed by said display unit is a tracking frame displayed on the captured image.

11. A tracking method for an image pick-up apparatus that generates captured images in series, said method comprising:
 a specifying step of the image pick-up apparatus specifying a subject included in the captured image;
 a tracking step of the image pick-up apparatus tracking the specified subject by extracting a region of the specified subject in the presently generated captured image having high correlation with a region of the specified subject in the precedently generated captured image;
 a display step of the image pick-up apparatus displaying the captured image on a screen and display identification information showing that the specified subject is tracked; and
 a setting step of the image pick-up apparatus setting a holding time in which the display of the identification information is held according to a sensitivity of an image sensor of the image pick-up apparatus,
 wherein said display step continues to display the identification information when the holding time does not lapse after said tracking step lost the subject, and eliminates a display of the identification information when the holding time has passed after the subject has been lost in said tracking step, and
 wherein said setting step sets the holding time shorter as the sensitivity of the image sensor is set higher.

\* \* \* \* \*